(12) United States Patent
Chen et al.

(10) Patent No.: US 11,079,097 B2
(45) Date of Patent: Aug. 3, 2021

(54) FIXING STRUCTURE OF LIGHTING APPARATUS AND LIGHTING APPARATUS OF SHELF

(71) Applicant: XIAMEN ECO LIGHTING CO. LTD., Xiamen (CN)

(72) Inventors: Chunteng Chen, Xiamen (CN); Yuanbin Yu, Xiamen (CN); Biquan Lin, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 16/556,207

(22) Filed: Aug. 29, 2019

(65) Prior Publication Data

US 2021/0048177 A1    Feb. 18, 2021

(30) Foreign Application Priority Data

Aug. 12, 2019  (CN) .......................... 201921301695.1

(51) Int. Cl.
| *F21V 21/088* | (2006.01) |
| *A47B 97/00* | (2006.01) |
| *B65G 1/02* | (2006.01) |

(52) U.S. Cl.
CPC ............ *F21V 21/088* (2013.01); *A47B 97/00* (2013.01); *B65G 1/02* (2013.01); *A47B 2220/0077* (2013.01)

(58) Field of Classification Search
CPC ................... F21V 21/088; A47B 97/00; A47B 2220/0077; B65G 1/02
USPC .......................................................... 362/127
See application file for complete search history.

(56) References Cited

U.S. PATENT DOCUMENTS

| 2010/0102185 A1* | 4/2010 | Jenestreet ............... F16B 12/42 248/218.4 |
| 2014/0153279 A1* | 6/2014 | Weyer ..................... A47F 11/10 362/604 |

* cited by examiner

*Primary Examiner* — Andrew J Coughlin
*Assistant Examiner* — Jessica M Apenteng
(74) *Attorney, Agent, or Firm* — Chun-Ming Shih; Lanway IPR Services

(57) ABSTRACT

A lighting device fixing structure and a shelf lighting fixing structure are provided. The fixing structure of the lighting apparatus has a first fastener unit wrapping a surface of a shelf, a second fastener unit wrapping the surface of the shelf, wherein one of the first fastener unit and the second fastener unit is fixed to a light body, the first fastener unit and the second fastener unit are connected in a rotatable manner. The fixing structure of the lighting apparatus also has a fastener unit for locking the first fastener unit and the second fastener unit to each other, wherein the first fastener unit and the second fastener unit wrap and fix to a shelf.

5 Claims, 6 Drawing Sheets

FIXING STRUCTURE OF LIGHTING APPARATUS AND LIGHTING APPARATUS OF SHELF

FIELD

The present invention is related to a lighting device and more particularly related to a lighting device used in a shelf.

BACKGROUND

A shelf is needed for placing objects in fields including warehouse storage and logistics. In order to easily arrange objects, operators can fix a light body on the shelf to make the surrounding has full light. A structure of a current art of using a fixing belt or a fixing tie to fix the light body is not stable. The structure is easy to be damaged and is not capable of standing more impact force. The life span is shorter.

SUMMARY OF INVENTION

A fixing structure of a lighting apparatus provided is capable of solving the technical problems including the unstable structure and easy to be damaged. In order to solve the problems mentioned, the fixing structure has a first fastener unit wrapping a shelf surface, a second fastener unit wrapping the shelf surface, wherein one of the first fastener unit and the second fastener unit is fixed to a light body, the first fastener unit and the second fastener unit are connected in a rotatable manner. The fixing structure also has a fastener device for locking the first fastener unit and the second fastener unit to each other, wherein the first fastener unit and the second fastener unit wrap and fix on a shelf.

Further, the first fastener unit has a first rotation part, a first imitation part and a first fixing part connected in order. The second fastener unit has a second rotation part, a second imitation part and a second fixing part connected in order. The first rotation part and the second rotation part are connected in a rotatable manner. The fastener device is use for fixing the first fixing part and the second fixing part.

Further, the first fixing part has a first connection hole. The second fixing part has a second connection hole. The fastener device passes through the first connection hole and the second connection hole to fix the first fixing part to the second fixing part.

Further, the fixing structure also has a rotation shaft. The first rotation part has a third connection hole. The second rotation part has a forth connection hole. The rotation shaft passes through the third connection hole and the forth connection hole.

Further, the first rotation part and the second rotation part are circular tubular shape.

Further, the first rotation part has two first plugging parts. The second rotation part is between the two first plugging parts, wherein the second rotation part has a second plugging part connected the first plugging part on both sides. In some embodiments, the second rotation part has two first plugging parts. The first rotation part is between the two first plugging parts, wherein the first rotation part has a second plugging part connected the first plugging part on both sides.

Further, one of the first fastener unit and the second fastener unit has a light body fixing part, wherein the fixing part is used for fixing to the light body. The light body fixing part has a first fixing hole for connecting the fixing part to the light body.

A shelf lighting is also provided. The shelf lighting has at least one fixing structure of lighting apparatus, the light body and a fastener unit, wherein the fastener unit is used for fixing the fixing structure and the light body.

Further, the light body has a terminal structure for connecting wires.

Further, the external of the light body has a label part for labeling the object location.

The fixing structure of the lighting apparatus provided has the first fastener unit, the second fastener unit and the fastener device, wherein the first fastener unit and the second fastener unit are connected in a rotatable manner, one of the first fastener unit and the second fastener unit is use for fixing on the light body. When fixing the lighting apparatus on the shelf, the first fastener unit and the second fastener unit rotate relatively to let the first fastener unit and the second fastener unit wrap onto the external of the shelf. In addition, the fastener device locks the first fastener unit and the second fastener unit to let the light body be fixed on the shelf by the fixing structure. The structure of the fixing structure is stable enough to keep the fixing structure intact even being hit. The structure is capable of standing more impact force. The life span of the structure is longer.

DETAILED DESCRIPTION

Figure 1:
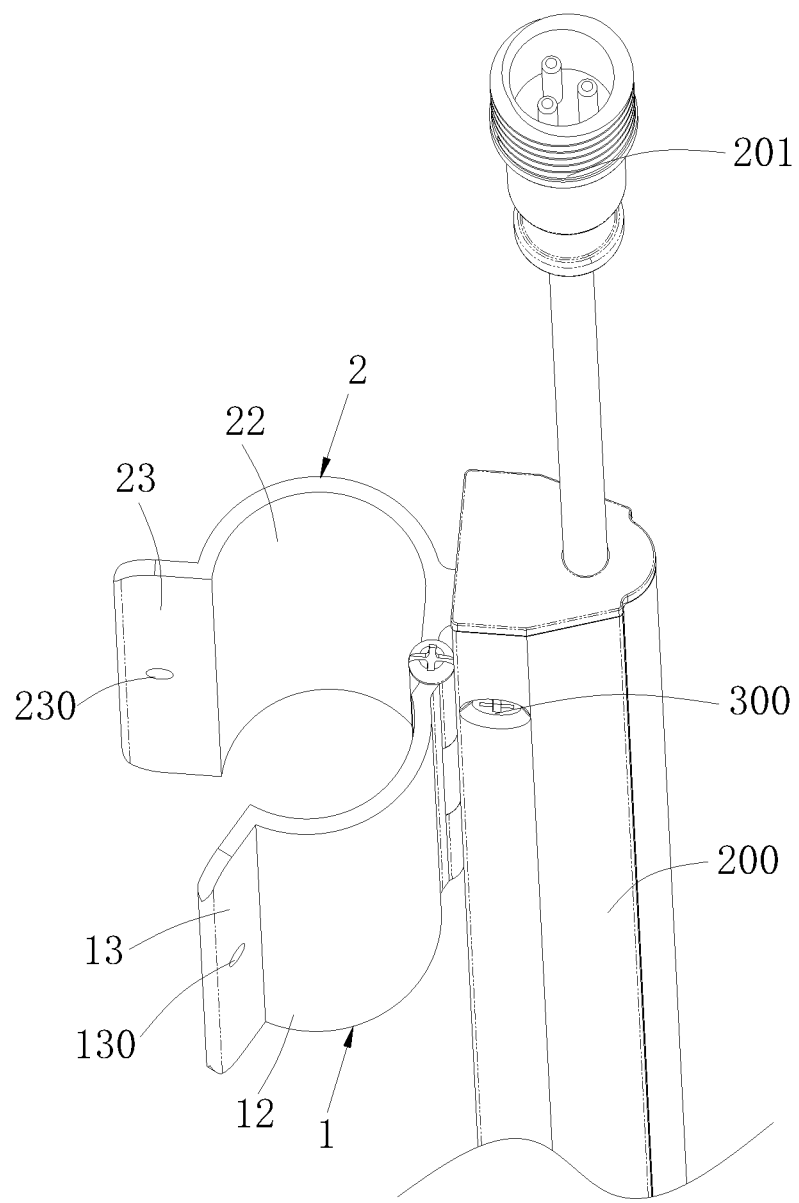
FIG. 1 illustrates a three-dimensional structural drawing of an expanding fixing structure.
Figure 2:
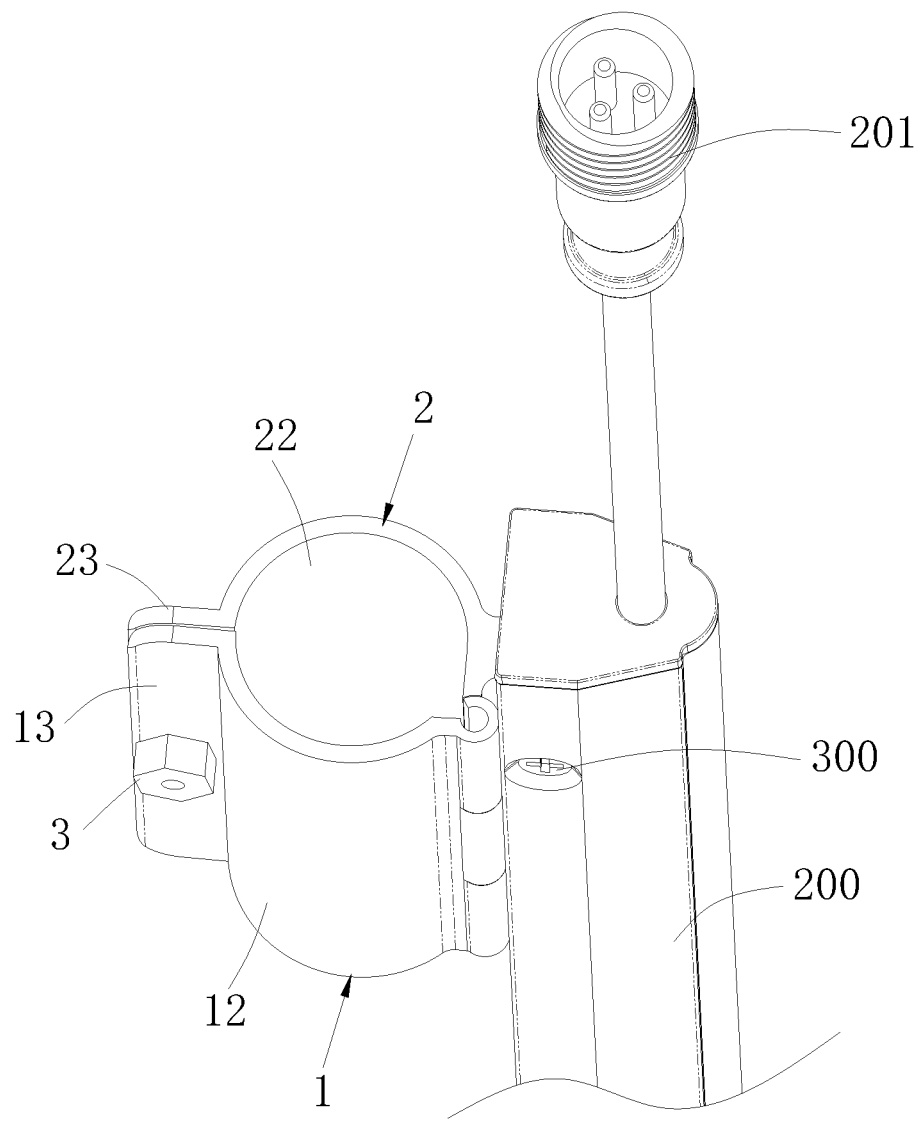
FIG. 2 illustrates a three-dimensional structural drawing of a locking fixing structure.
Figure 3:
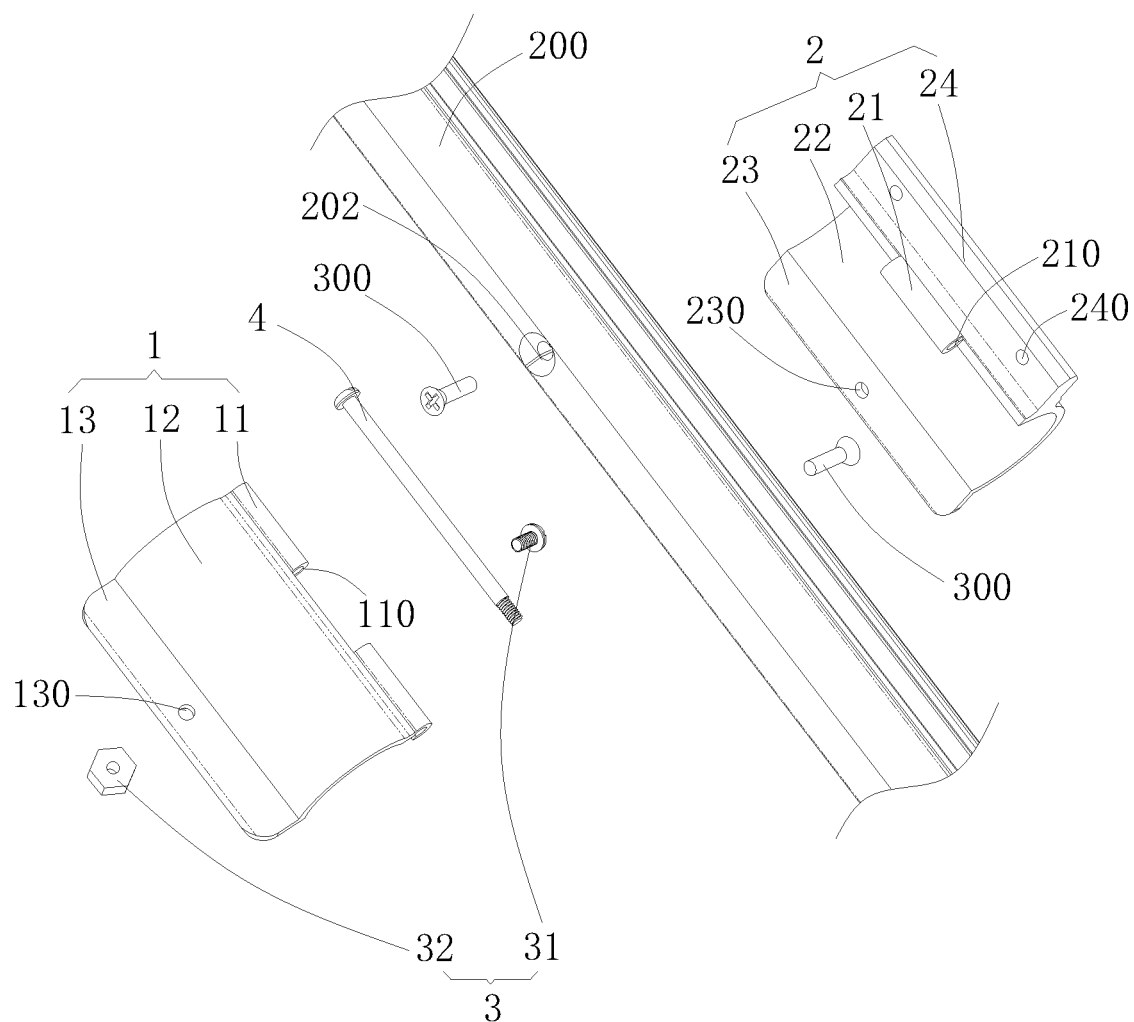
FIG. 3 illustrates an exploded view of the fixing structure.

Referring to FIG. 1 to FIG. 3, a fixing structure of lighting apparatus 100 is shown. The fixing structure 100 is used for fixing a light body 200 to a shelf 400. In an embodiment, the fixing structure 100 includes a first fastener unit 1, a second fastener unit 2 and a fastener device 3. The first fastener unit 1 and the second fastener unit 2 are connected in a rotatable manner, wherein one of the first fastener unit 1 and the second fastener unit 2 is fixed to the light body 200, the first fastener unit 1 and the second fastener unit 2 rotate relatively to let the first fastener unit 1 and the second fastener unit 2 wrap on the shelf 400, wherein the fastener device 3 locks the first fastener 1 and the second fastener 2 to each other to let the first fastener 1, the second fastener 2 and the light body 200 fix on the shelf 400. More particularly, the first fastener 1 and the second fastener 2 are rotated relatively to expand. Thus, the first fastener 1 and the second fastener 2 are capable of wrapping on the external of a crossbeam or a perpendicular crossbeam of the shelf 400. When the shape of an enclosing area of first fastener 1 and the second fastener 2 is similar to a cross section of the crossbeam or the perpendicular crossbeam of the shelf 400, the first fastener 1 and the second fastener 2 are rotated to lock. The fastener device 3 locks the first fastener 1 and the second fastener 2. Thus, the first fastener 1 and the second fastener 2 clips the crossbeam or the perpendicular crossbeam of the shelf 400 to fix the light body 200 to the shelf 400.

In the embodiment, the fixing structure 100 includes the first fastener 1, the second fastener 2 and the fastener device 3. The first fastener 1 and the second fastener 2 are connected in a rotatable manner, wherein one of the first fastener 1 and the second fastener 2 is fixed to the light body 200. When fixing the light body 200 to the shelf 400, the first fastener 1 and the second fastener 2 rotate relatively to let the first fastener 1 and the second fastener 2 wrap on the external of the shelf 400. In addition, the fastener device 3 locks the first fastener 1 and the second fastener 2 to let the light body 200 be fixed on the shelf 400 by the fixing structure 100. The structure of the fixing structure 100 is stable enough to keep the fixing structure 100 intact even being hit. The structure is capable of standing more impact force. The life span of the structure is longer.

Please refer to FIG. 1 to FIG. 3. In an embodiment, the first fastener 1 includes a first rotation portion 11, a first imitation part 12 and a first fixing part 13 connected in order. The second fastener 2 includes a second rotation portion 21, a second imitation part 22 and a second fixing part 23 connected in order. The first rotation portion 11 and the second rotation portion 21 are connected in a rotatable manner. The first imitation part 12 and the second imitation part 22 are used for wrapping the external if the shelf 400. The shape of the enclosing area of the first imitation part 12 and the second imitation part 22 is similar to the shape of the shelf 400 clipped. Illustratively, the first fastener 1 and the second fastener 2 fix on the perpendicular crossbeam of the shelf 400. The first imitation part 12 and the second imitation part 22 are circular. The perpendicular crossbeam is tubular. The first imitation part 12 and the second imitation part 22 enclose to make a hollow tubular to match the perpendicular crossbeam. The first fixing part 13 and the second fixing part 23 are locked by the fastener device 3. In the embodiment, the first fixing part 13 and the second fixing part 23 are far from a rotation shaft of the first rotation portion 11 and the second rotation portion 21 to let the first imitation part 12 and the second imitation part 22 wrapping the shelf 400 be placed between the rotation shaft and the fastener device 3. Both sides of the first imitation part 12 and the second imitation part 22 stand the pressing force to clip the shelf 400, the first imitation part 12 and the second imitation part 22. Therefore, the structure has more power to stand more impact force.

Please refer to FIG. 3. In an embodiment, the first fixing part 13 has a first connection hole 130, the second fixing part 23 has a second connection hole 230, the fastener device 3 passes through the first connection hole 130 and the second connection hole 230 to fix the first fixing part 13 and the second fixing part 23 to each other.

Further, the fastener device 3 includes a first bolt 31 and a first nut 32 connecting with the first bolt 31, the first bolt 31 passes through the first connection hole 130 and the second connection hole 230, the first nut 32 and the first bolt 31 locks the first fixing part 13 and the second fixing part 23. In some embodiments, the fastener device 3 includes the first bolt 31 and one of the first connection hole 130 and the second connection hole 230 served as a tapped hole to connect with the first bolt 31. The two structures of fastener device 3 are easy to disassemble the fixing structure 100.

Please refer to FIG. 3. In an embodiment, the fixing structure 100 includes a rotation shaft 4. The first rotation portion 11 has a third connection hole 110. The second rotation portion 21 has a forth connection hole 210. The rotation shaft 4 passes through the third connection hole 110 and the forth connection hole 210 to let the first fastener 1 and the second fastener 2 rotate oppositely to the axis of the rotation shaft 4. In the embodiment, the structure of the first rotation portion 11 and the second rotation portion 21 are easier, wherein only the third connection hole 110 and the forth connection hole 210 are needed to be set.

Further, the rotation shaft 4 includes a second bolt and a second nut connecting to the second bolt. The second bolt passes through the third connection hole 110 and the forth connection hole 210, the second nut connects to the second bolt to let the first rotation portion 11 and the second rotation portion 21 be limited between the head of the second nut and the second bolt. In the embodiment, the rotation shaft 4, the first fastener 1 and the second fastener 2 are capable of being disassembled for the repair, the element changing and the reuse. The rotation shaft 4 may be a pin to let the first fastener 1 and the second fastener 2 rotate around the axis of the pin.

Please refer to FIG. 3. In an embodiment, the first rotation portion 11 and the second rotation portion 21 are hollow tubular to let the first rotation portion 11 has the third connection hole 110 and the second rotation portion 21 has the forth connection hole 210. This method lets the rotation shaft 4 passes through the first rotation portion 11 and the second rotation portion 21, and reduces the volume of the first rotation portion 11 and the second rotation portion 21 as much as possible to avoid interfering the light body 200 when rotating. In the embodiment, the quantity of the first rotation portion 11 and the second rotation portion 21 is not limited. The first rotation portion 11 and the second rotation portion 21 may be set interlaced to let the rotation shaft 4 bears the load balanced when the rotation shaft 4 passes through the first rotation portion 11 and the second rotation portion 21.

In an embodiment, the first rotation portion 11 has two first plugging parts, the second rotation portion 21 is between the two first plugging parts, wherein the second rotation portion 21 has a second plugging part connected the first plugging part on both sides. The first plugging part is a protrusion part, the second plugging part is a notch part. In some embodiments, the first plugging part is a notch part, the second plugging part is a protrusion part. The first rotation portion 11 plugs with the second rotation portion 21 to shape the rotation shaft, the central of the protrusion part is the rotation axis. Therefore, the rotation shaft 4 is capable of connecting with the first rotation portion 11 and the second rotation portion 21 in a rotatable manner without extra setting.

In an embodiment, the second rotation portion 21 has two first plugging parts, the first rotation portion 11 is between the two first plugging parts, wherein the first rotation portion 11 has a second plugging part connected the first plugging part on both sides.

Please refer to FIG. 3. In an embodiment, one of the first fastener 1 and the second fastener 2 has a light body fixing part 24, the light body fixing part 24 has a first fixing hole 240, the first fixing hole 240 is used for fixing the first fastener 1 and the second fastener 2 to the light body 200. Illustratively, the light body fixing part 24 connects to the second fastener 2. More particularly, the light body fixing part 24 connects to the second imitation part 22 of the second fastener 2. The light body fixing part 24 is near the light body 200. In the embodiment, the connecting part of the first fastener 1 and the second fastener 2 is near the light body 200 to let the first fastener 1 and the second fastener 2 bear less torque when rotating relatively to maintain the power of the fixing structure 100.

Figure 4:
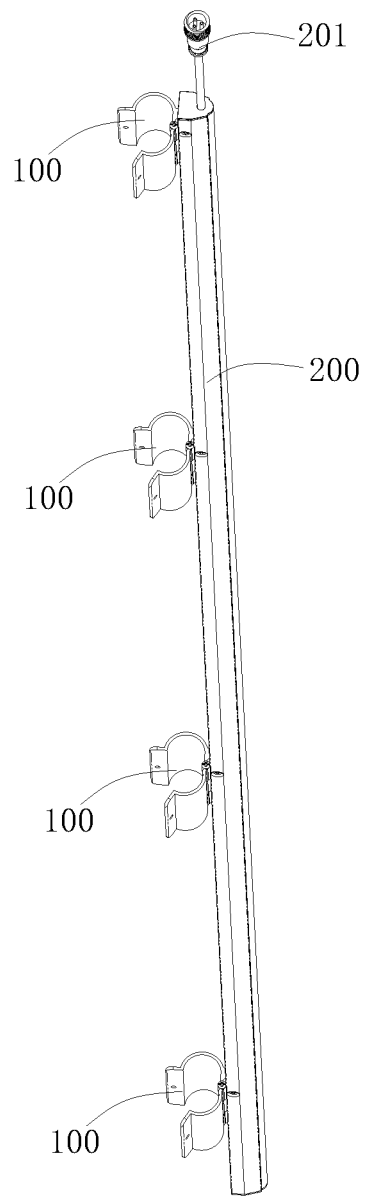
FIG. 4 illustrates a three-dimensional structural drawing of an expanding shelf lighting.
Figure 5:
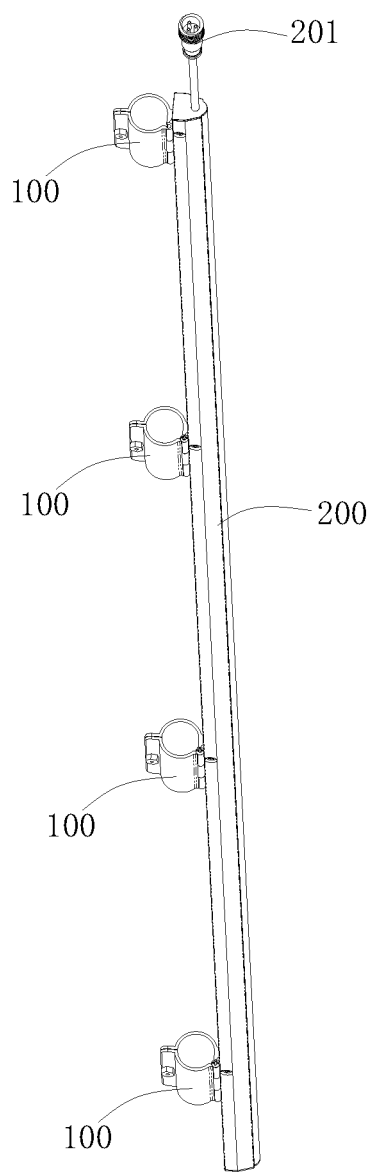
FIG. 5 illustrates a three-dimensional structural drawing of a locking shelf lighting.
Figure 6:
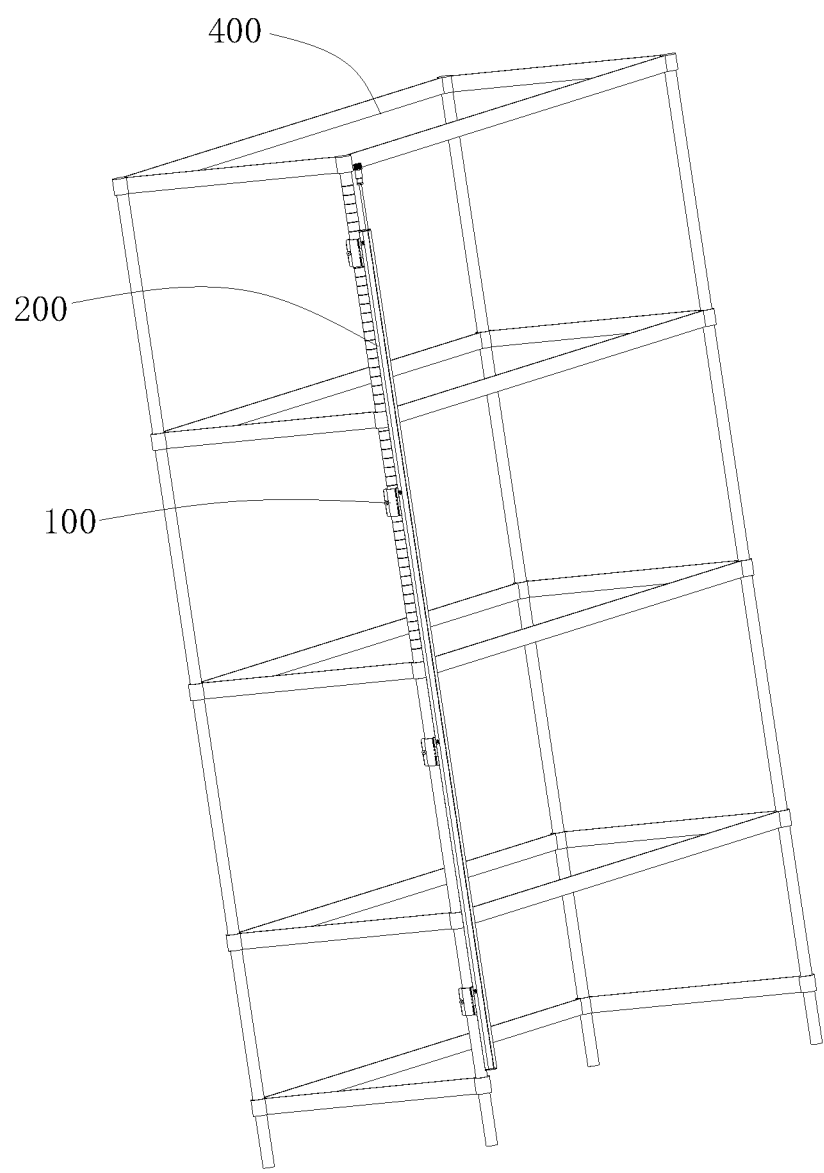
FIG. 6 illustrates a three-dimensional structural drawing of the shelf lighting locking to the shelf.

Referring to FIG. 4 to FIG. 6, a shelf lighting is shown, wherein the shelf lighting includes one of the embodiments of the fixing structure 100. The shelf lighting includes the light body 200 and the fastener device 300 fixing the light body 200 to the fixing structure 100. The shape of the light body 200 may be linear, round, board-shaped, and so on. The fastener device 300 may be a screw, the bolt, and so on. The first fastener 1 or the second fastener 2 has the first fixing hole 240, the light body 200 has a second fixing hole 202, the second fixing hole may be a tapped hole, the fastener device 300 passes through the first fixing hole 240 to connect to the second fixing hole 202.

The shelf lighting adopts one of the embodiments of the fixing structure 100 to makes the structure stable enough to keep the shelf lighting intact even being hit. The shelf lighting is capable of standing more impact force. The life span of the shelf lighting is longer.

The quantity of the fixing structure 100 may be multiple to make the light body 200 more stable when fixing to the shelf 400. For example, the light body 200 is linear, the fixing structure 100 distributes lengthwise the linear lighting; the light body 200 is round, the fixing structure 100 distributes along the circular direction the round lighting; the light body 200 is board-shaped, the fixing structure 100 distributes arrayed on the board-shaped lighting.

Please refer to FIG. 4 and FIG. 5. In an embodiment, the light body 200 has a terminal structure 201 for connecting wires. The terminal structure 201 may be male or female. The terminal structure 201 is convenient for connecting the light body 200 and the terminal of wires, the electric contact is more stable.

In an embodiment, the light body 200 has a label part for labeling object location to let operators position the object location fast. The label part may be placed on the cover or the shell of the light body 200. The label part may be an identifiable mark, such as words, letters, or patterns.

In an embodiment, the lighting apparatus also includes a communication circuit and a detection circuit sending malfunction information to server when detecting malfunction situation. For example, a network of Bluetooth or Wi-Fi sets a server managing the object circulation, the server connects to a moving robot, and the moving robot is capable of solving malfunction situation, such as changing bulb.

In an embodiment, the lighting apparatus also includes a plugging base for fixing the light body, the plugging base has a locking structure, a moving robot moves to the malfunctioned light body according to the malfunction information sent and decodes the locking structure to change the light body automatically.

In an embodiment, the lighting apparatus further includes the communication circuit receiving wireless signal sent by a portable device, the wireless signal is related to objects located on the shelf, the communication circuit controls the light body and shows an object information by outputting different light pattern. For example, the object location is indicated by different light color or pattern.

In an embodiment, the wireless signal is embedded in the output light pattern. Therefore, the corresponded machine is capable of decoding the light signal to learn the shelf information when operators use the lighting part.

It is to be understood that the forms of the invention shown are preferred embodiments thereof and that various changes and modifications may be made therein without departing from the spirit of the invention or scope as defined in the following claims.

The invention claimed is:

1. A fixing structure of a lighting apparatus, comprising:
a first fastener unit wrapping a surface of a shelf;
a second fastener unit wrapping the surface of the shelf, wherein one of the first fastener unit and the second fastener unit is fixed to a light body, the first fastener unit and the second fastener unit are connected in a rotatable manner; and
a fastener unit for locking the first fastener and the second fastener to each other, wherein the first fastener comprises a first rotation portion, a first shape imitation part and a first fixing part connected in order, the second fastener comprises a second rotation portion, a second imitation part and a second fixing part connected in order, the first rotation portion and the second rotation portion are connected in a rotatable manner, the fastener unit is used for fixing the first fixing part to the second fixing part, wherein the lighting structure further comprises a rotation shaft, the first rotation portion has a third connection hole, the second rotation portion has a forth connection hole, the rotation shaft passes through the third connection hole and the forth connection hole.

2. The fixing structure of claim 1, wherein the first fixing part has a first connection hole, the second fixing part has a second connection hole, the fastener unit passes through the first connection hole and the second connection hole to fix the first fixing part to the second fixing part.

3. The fixing structure of claim 1, wherein the first rotation portion and the second rotation portion are circular tubular shape.

4. The fixing structure of claim 1, wherein the first rotation portion has two first plugging parts, the second rotation portion is between the two first plugging parts and has a second plugging part connected the first plugging part on both sides; the second rotation portion has two first plugging parts, the first rotation portion is between the two first plugging parts and has a second plugging part connected the first plugging part on both sides.

5. The fixing structure of claim 1, wherein one of the first fastener and the second fastener has a light body fixing part used for fixing to the light body, the light body fixing part has a first fixing hole for fixing the light body.

* * * * *